(12) United States Patent
Sanchez

(10) Patent No.: US 11,308,529 B2
(45) Date of Patent: Apr. 19, 2022

(54) APPARATUS AND METHOD FOR MARKETING AND SELLING OF GOODS

(71) Applicant: SNAG Innovations, Inc., Humble, TX (US)

(72) Inventor: Victor G Sanchez, Humble, TX (US)

(73) Assignee: SNAG INNOVATIONS, INC., Humble, TX (US)

( * ) Notice: Subject to any disclaimer, the term of this patent is extended or adjusted under 35 U.S.C. 154(b) by 0 days.

(21) Appl. No.: 17/028,584

(22) Filed: Sep. 22, 2020

(65) Prior Publication Data

US 2022/0092648 A1    Mar. 24, 2022

(51) Int. Cl.
| | |
|---|---|
| *G06Q 30/00* | (2012.01) |
| *G06Q 30/02* | (2012.01) |
| *G06Q 30/06* | (2012.01) |
| *H04L 29/08* | (2006.01) |
| *H04N 21/81* | (2011.01) |
| *H04L 67/141* | (2022.01) |
| *G06Q 20/24* | (2012.01) |
| *G06Q 20/34* | (2012.01) |

(52) U.S. Cl.
CPC ..... *G06Q 30/0277* (2013.01); *G06Q 30/0267* (2013.01); *G06Q 30/0633* (2013.01); *H04L 67/141* (2013.01); *H04N 21/812* (2013.01); *G06Q 20/24* (2013.01); *G06Q 20/34* (2013.01); *G06Q 30/0282* (2013.01)

(58) Field of Classification Search
None
See application file for complete search history.

(56) References Cited

U.S. PATENT DOCUMENTS

| | | | | |
|---|---|---|---|---|
| 2006/0080539 | A1* | 4/2006 | Asami | G06Q 20/04 |
| | | | | 713/182 |
| 2006/0136969 | A1* | 6/2006 | Patton | A63J 25/00 |
| | | | | 725/78 |
| 2008/0140521 | A1* | 6/2008 | Jambunathan | G06F 16/9535 |
| | | | | 705/14.54 |
| 2010/0299603 | A1* | 11/2010 | Farkas | G06F 16/44 |
| | | | | 715/733 |
| 2013/0274013 | A1* | 10/2013 | Boncyk | G06K 9/6202 |
| | | | | 463/31 |
| 2014/0288761 | A1* | 9/2014 | Butler | G07C 5/0816 |
| | | | | 701/29.6 |
| 2015/0081416 | A1* | 3/2015 | Ringo | G06Q 30/0237 |
| | | | | 705/14.37 |

OTHER PUBLICATIONS

IP.com Search Strategy dated Apr. 9, 2021. (Year: 2021).*
IP.com Search Strategy dated Apr. 10, 2021 (Year: 2021).*
IP.com NPL Search Strategy Apr. 10, 2021 (Year: 2021).*
STIC 3600 EIC Search Report for application 17028584 dated Aug. 20, 2021 (Year: 2021).*

* cited by examiner

*Primary Examiner* — Matthew T Sittner
(74) *Attorney, Agent, or Firm* — Ewing & Jones, PLLC

(57) ABSTRACT

A method and apparatus that provides for marketing and selling of goods by a computer application that interconnects with a media source that displays the goods.

10 Claims, 5 Drawing Sheets

APPARATUS AND METHOD FOR MARKETING AND SELLING OF GOODS

CROSS-REFERENCE TO RELATED APPLICATIONS

None.

FIELD OF THE DISCLOSURE

Aspects of the disclosure relate to an apparatus and method for marketing and selling goods. More specifically, aspects of the disclosure relate to a marketing and selling ecosystem tying objects shown in media to a website and/or customers through an interconnected application.

BACKGROUND

As time progresses, entertainment industries break new ground in providing entertainment options to consumers. Aside from traditional print media, today's consumers wish to have instant access to entertainment upon demand. Today's consumers also demand customer buying options that meet their lifestyle and provide convenience.

Conventional entertainment options have grown over the last 70 years. Aside from print media, movie production has been a staple of media consumers for generations. A simple motion picture would show a pre-scripted plot that could be enjoyed by the viewer. In the 1980's advertisers realized that placement of products within a motion picture could significantly increase sales. "Product placement" became a cornerstone for marketing and consumer products battled each other to place products within motion pictures to increase sales. Such placement could be monetized by the motion picture industry by charging the consumer products wishing to be advertised, thereby offsetting some of the costs of motion picture production.

Product placement has undoubtedly worked, for both advertisers and the motion picture industry. Significant drawbacks, however, remain for product placement that remain unsolved.

A first drawback for product placement is experienced by advertisers. Some portions of a motion picture are more captivating or important to the plot than others, therefore these portions will be remembered more vividly by the consumer than other instances. The motion picture industry, therefore, will charge a higher monetary amount for placement in these scenes rather than a more common or mundane scene. In this way, advertisers are at somewhat of a disadvantage as they can be limited as to which scene their product may be placed in. Another disadvantage is that a consumer is required to "remember" the product placed after the motion picture has ended. Only then can a consumer attempt to find the product placed in the motion picture. In the instance of a non-Important scene, the advertiser may pay for a product placement and not increase sales as the scene is not memorable to the viewer. As a result, advertisers must use caution when creating a product placement.

A second drawback is found in the motion picture industry itself. If advertisers are unwilling to pay for product placement, the motion picture industry is required to pay for production costs up front. As time goes on, the costs of producing motion pictures has increased dramatically, thereby putting financial strain upon production companies. There is a need, therefore, to successfully monetize product placement in all aspects of a motion picture, for important and more mundane scenes, to help defer costs of motion picture development.

A third drawback if experienced by the consumer. If a consumer wishes to purchase a product advertised or shown in a motion picture, the consumer must remember the product and then attempt to find the product, see if the product is actually for sale, find an outlet that carries inventory of the potential product, and then purchase the product in an economically safe environment. All of these multiple steps hinder the purchasing process and therefore restrict overall sales.

A fourth drawback experienced by the advertiser, the motion picture industry, and the consumer is the passage of time. It is known in multiple types of industries that trends can occur. Most consumer products have a shelf-life or amount of time that the product is "saleable". The fashion industry, for example, has trends or "fads" that occur. Purchase of clothes that exhibit the latest fads allows the seller to command a higher price than other older items. It is thus important that a consumer be able to review purchasing items quickly to be able to buy the latest trendy item. It is also important for advertisers to market their products to consumers at the right time. As a non-limiting embodiment, items such as swimwear are more properly placed in a motion picture that is shown in the summer time rather than winter, as consumers will be more willing to buy the product that is needed immediately, rather than at a later time.

There is a need to provide an apparatus and methods that make it easier to purchase products than currently provided by conventional apparatus and methods.

There is a further need to provide apparatus and methods that do not have the drawbacks discussed above.

There is a still further need to reduce economic costs associated with marketing and sales of products to help the motion picture industry, advertisers, and the consuming public compared to conventional methods.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting example embodiment, a method of marketing and selling goods is disclosed. In one non-limiting embodiment, the method may comprise broadcasting a stream of data from a data source. The method may also comprise using an electronic device to identify the data source. The method may also comprise connecting the electronic device to a server to retrieve the marketing and goods being sold in connection with the data source. The method may also comprise displaying the marketing and goods that are connected to the data source.

In another example embodiment, a method of performing marketing and selling of goods is disclosed. The method may comprise broadcasting a motion picture to at least one viewer. The method may also comprise identifying the motion picture using an electronic device. The method may also comprise connecting the electronic device to an Internet connected server. The method may also comprise retrieving a list of goods being sold related to the motion picture to the electronic device. The method may also provide for displaying the list of goods that are connected to the data source.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

Figure 1:
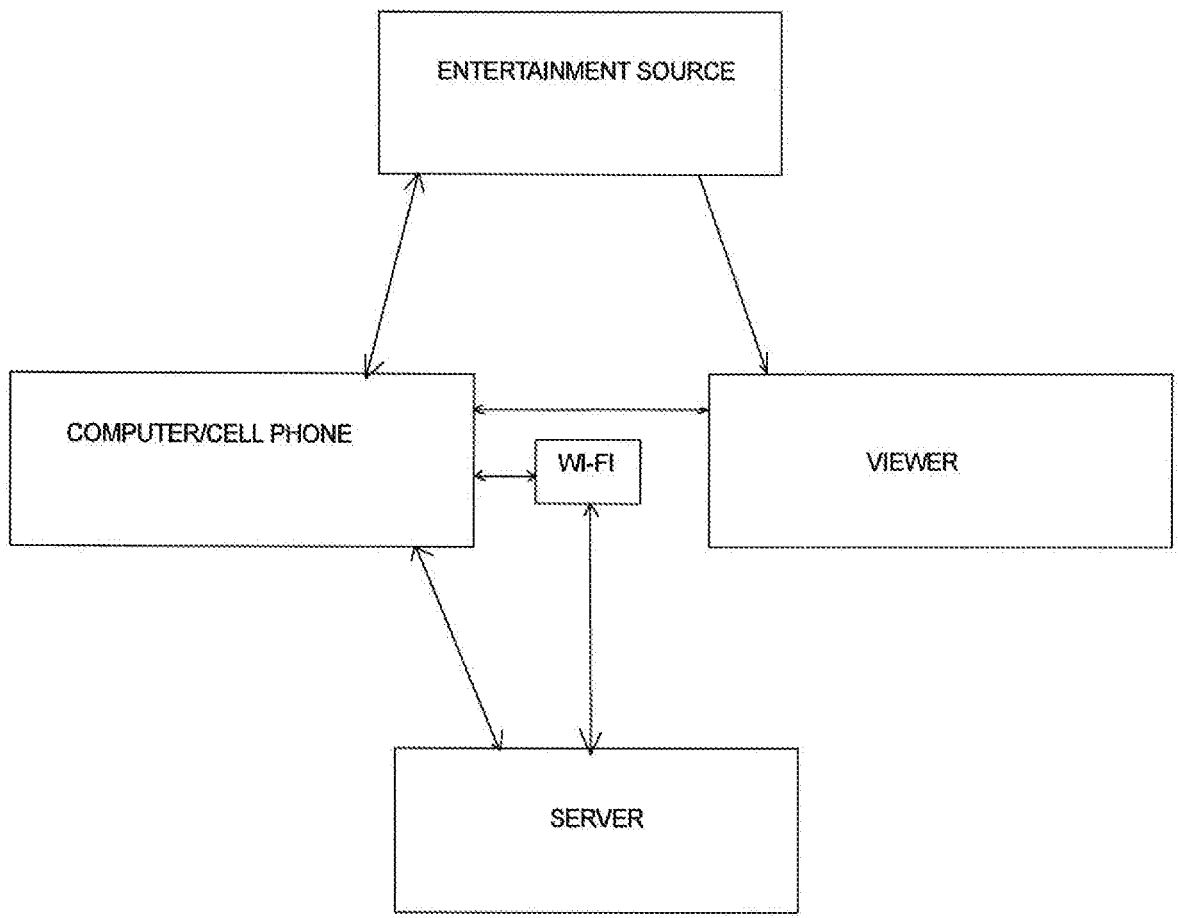
FIG. 1 is a schematic drawing of an ecosystem incorporating a consumer, an advertiser and a media content provider.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" Includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Referring to FIG. 1, an ecosystem for marketing and selling goods is illustrated. The embodiments disclosed provide both a method and apparatus for selling goods, such as in a non-limiting embodiment consumer goods, through a computer application. Oftentimes, a consumer will want to enjoy an entertainment source, such as a motion picture or television. During viewing of the entertainment source, a plot is performed and the viewer may be attracted to a particular item shown in the entertainment source. As a non-limiting embodiment, an actor may be wearing a leather jacket that the viewer may find attractive. In embodiments, during playback of the motion picture or television show, an interlinked computer application will allow a consumer to review items currently being shown, that have been shown, or that will be shown, that are associated with the motion picture or television show for purchase by the consuming viewer. In embodiments, the computer application may take input from a television, from Wi-Fi, or an internet connection to allow tracking of the motion picture or television show and provide a quick and easy purchasing opportunity for the viewer.

Interconnection between the computer program and the media source may be established by several methods. In one non-limiting embodiment, a pre-populated set of products may be provided for viewing. Such pre-populated set of products may be a static list of items that are produced when the motion picture or television show is released. In other embodiments, the set of products may be a dynamic set of products that may be altered by either a computer programmer or through defined preferences of the viewer. For example, a viewer of the media source may be only interested in clothing items, therefore, either the pre-populated set of products or the dynamic set of products may be filtered according to preferences by the user.

In embodiments, it will be understood that purchasing of a consumer good can be enhanced by allowing for an advertisement of the consumer good on the computer application. Furthermore, a special price for the consumer good may be provided to the consumer during a limited time during the motion picture or television show or a set period of time following the conclusion of either, thereby providing an incentive to purchase the consumer good.

In embodiments, the computer program may be installed on a personal computer, a laptop computer or a cellular phone, as non-limiting embodiments. As will be understood, the computer program may be enabled to connect to other computers or the Internet to allow transfer of data to and from the computer program user.

In embodiments, advertisers may compete with one another to have their specific websites selling the searched items show first in a search engine. In this manner, the ecosystem provider may allow different vendors access to a ranked list on the search engine according to a fee paid by the vendor.

Figure 2:
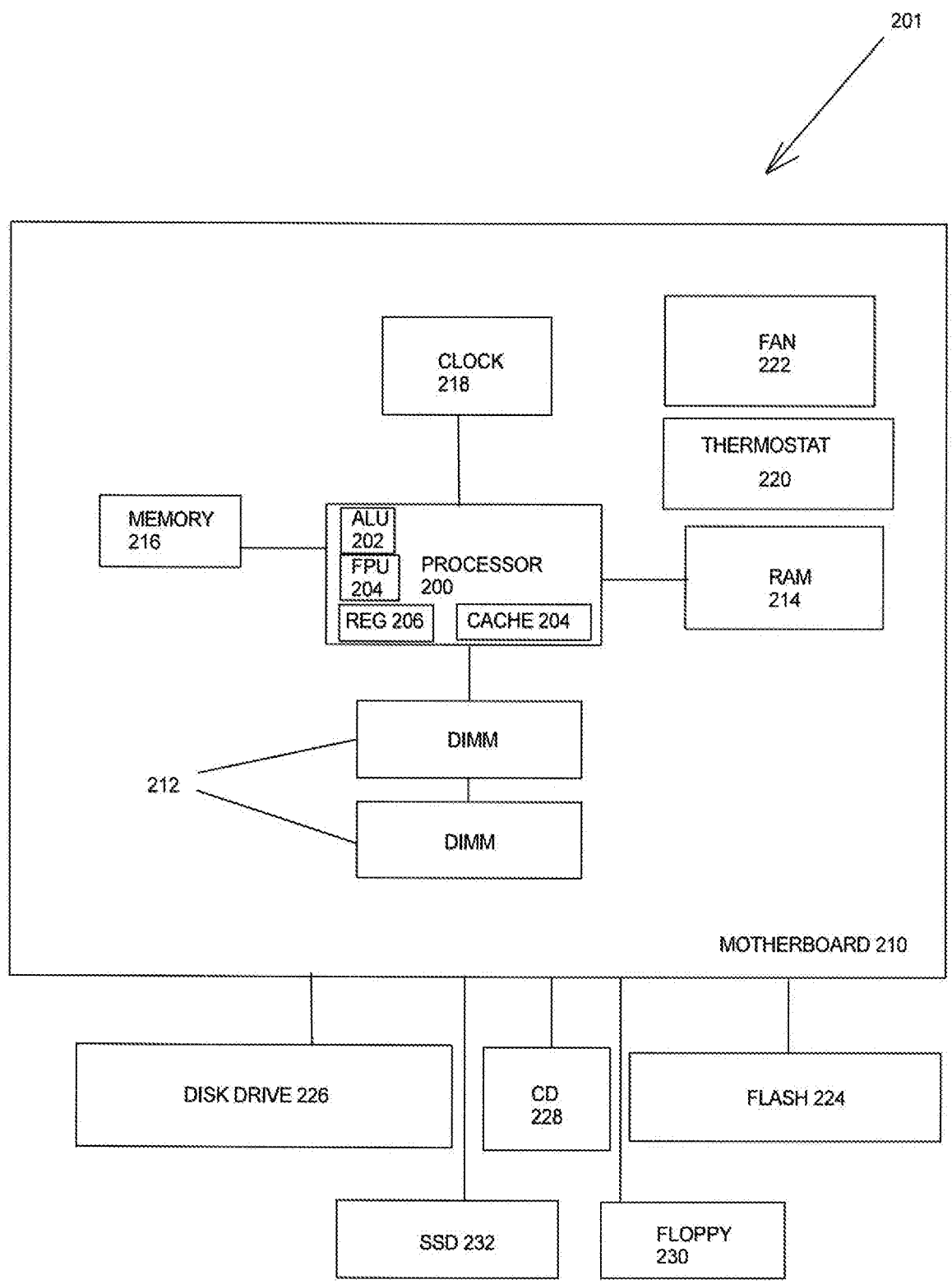
FIG. 2 is a computer apparatus used in performing methods and controlling apparatus for operations described in FIG. 1.

In such embodiments, referring to FIG. 2, a computing apparatus used in the control of equipment of FIG. 1 is illustrated. In FIG. 2, a processor 200 is provided to perform computational analysis for instructions provided. The instruction provided, code, may be written to achieve the desired goal and the processor may access the instructions. In other embodiments, the instructions may be provided directly to the processor 200.

In other embodiments, other components may be substituted for generalized processors. These specifically designed components, known as application specific integrated circuits ("ASIC's") are specially designed to perform the desired task. As such, the ASIC's generally have a smaller footprint than generalized computer processors. The ASIC's, when used in embodiments of the disclosure, may use field programmable gate array technology, that allows a user to make variations in computing, as necessary. Thus, the methods described herein are not specifically held to a precise embodiment, rather alterations of the programming may be achieved through these configurations.

In embodiments, when equipped with a processor 200, the processor may have arithmetic logic unit ("ALU") 202, a floating point unit ("FPU") 204, registers 206 and a single or multiple layer cache 208. The arithmetic logic unit 202 may perform arithmetic functions as well as logic functions. The floating point unit 204 may be math coprocessor or numeric coprocessor to manipulate numbers more efficiently and quickly than other types of circuits. The registers 206 are configured to store data that will be used by the processor 200 during calculations and supply operands to the arithmetic logic unit 202 and store the result of operations. The single or multiple layer caches 208 are provided as a storehouse for data to help in calculation speed by preventing the processor 200 from continually accessing random access memory ("RAM").

Aspects of the disclosure provide for the use of a single processor 200. Other embodiments of the disclosure allow the use of more than a single processor 200. Such configurations may be called a multi-core processor where different functions are conducted by different processors to aid in calculation speed. In embodiments, when different processors are used, calculations may be performed simultaneously by different processors, a process known as parallel processing.

The processor 200 may be located on a motherboard 210. The motherboard 210 is a printed circuit board that incorporates the processor 200 as well as other components helpful in processing, such as memory modules ("DIMMS") 212, random access memory 214, read only memory, non-volatile memory chips 216, a clock generator 218 that keeps components in synchronization, as well as connectors for connecting other components to the motherboard 210. The motherboard 210 may have different sizes according to the needs of the computer architect. To this end, the different sizes, known as form factors, may vary from sizes from a cellular telephone size to a desktop personal computer size. The motherboard 210 may also provide other services to aid in functioning of the processor 200, such as cooling capacity. Cooling capacity may include a thermometer 220 and a temperature controlled fan 222 that conveys cooling air over the motherboard 210 to reduce temperature.

Data stored for execution by the processor 200 may be stored in several locations, including the random access memory 214, read only memory, flash memory 224, computer hard disk drives 226, compact disks 228, floppy disks 230 and solid state drives 232. For booting purposes, data may be stored in an integrated chip called an EEPROM, that is accessed during start-up of the processor 200. The data, known as a Basic Input/Output System ("BIOS"), contains, in some example embodiments, an operating system that controls both internal and peripheral components.

Different components may be added to the motherboard 210 or may be connected to the motherboard 210 to enhance processing. Examples of such connections of peripheral components may be video input/output sockets, storage configurations (such as hard disks, solid state disks, or access to cloud based storage), printer communication ports, enhanced video processors, additional random access memory and network cards.

The processor and motherboard may be provided in a discrete form factor, such as personal computer, cellular telephone, tablet, personal digital assistant or other component. The processor and motherboard may be connected to other such similar computing arrangement in networked form. Data may be exchanged between different sections of the network to enhance desired outputs. The network may be a public computing network or may be a secured network where only authorized users or devices may be allowed access.

As will be understood, method steps for completion may be stored in the random access memory, read only memory, flash memory, computer hard disk drives, compact disks, floppy disks and solid state drives.

Different input/output devices may be used in conjunction with the motherboard and processor. Input of data may be through a keyboard, voice, Universal Serial Bus ("USB") device, mouse, pen, stylus, Firewire, video camera, light pen, joystick, trackball, scanner, bar code reader and touch screen. Output devices may include monitors, printers, headphones, plotters, televisions, speakers and projectors.

In embodiments, a communications link may be established between the computer or cellular phone reviewed by the user and the broadcast. In one non-limiting embodiment, the communications link may be live such that items on a visual screen of the broadcast, for example, are advertised on the computer or cellular phone. The communications link can be established through a Wi-Fi connection or a Bluetooth connection. In other embodiments, a microphone on the computer or cellular phone may listen and process audio details currently playing on the broadcast. Such identifying sounds can then be used to trigger advertisements on the computer or cellular phone. In embodiments, a time delay may be established allowing for advertising after a specific plot scene, for example. In other embodiments, the communications link can be "hard wired", such as connecting the computer to an Ethernet connection.

Recognition capability can be built into the computer, laptop or cellular phone to allow for verification of user identity. Recognition capability can be performed through voice recognition, facial recognition, fingerprint recognition and password/passkey as non-limiting embodiments.

In other embodiments, the communication link between the computer or cellular phone to the broadcast may be through a television. Such communication link may provide for a "picture in picture" capability wherein ordering of advertised items can be performed on the television screen and control of the items ordered may be done by the computer or cellular phone being used as a remote controller. In other embodiments, the use of a separate computer or cellular phone may be eliminated altogether and a separate advertising screen may be broadcast on the television for consumer ease. Ordering may occur through use of a television remote control. In such embodiments, a user's television account, such as a cable television account, may be used for authentication purposes. In such embodiments, the cable television account may already have credit card charge capabilities, thereby allowing the user to order materials directly on the television screen without resorting to a secondary device or credit verification process.

Figure 3:
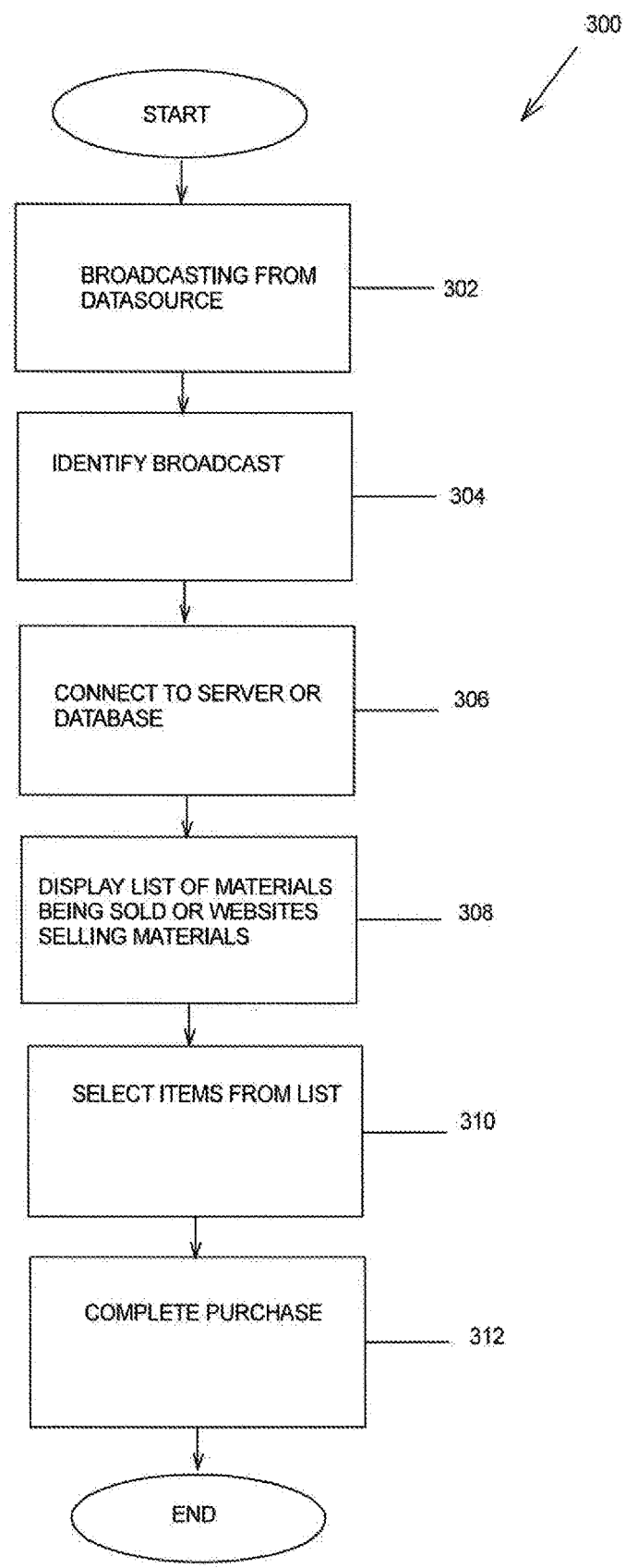
FIG. 3 is a flowchart of a method to perform a purchase of a consumer item.

Referring to FIG. 3, a method for performing a method of marketing and selling goods is illustrated. The method 300 may include broadcasting a stream of data from a data source at 302. The data source may be, in non-limiting embodiments, a motion picture, a television show or a radio program. At 304, a receiving device is established to identify the data source being broadcast. By way of definition, the term establishing or established may include using a component, such as an electronic device. In non-limiting embodiments, the receiving device may be a computer, a laptop computer, a cellular phone or a tablet. The receiving device may have connection capability to other computers through the internet. The receiving device may be established by loading a program into the memory of the receiving device. For purposes of illustration, the memory may be a non-volatile memory or a volatile memory. Once the receiving device identifies the data source being broadcast, the computer program in the memory of the receiving device may connect to a server, for example, connected through the internet to identify materials or goods that appear on the data source at 306. The materials or goods may then be displayed on the electronic device. These materials or goods may be sold through the electronic device wherein a user may input a credit card number and address for delivery of the material or good being purchased. In other instances, an advertisement may be provided to the user, whereby the user is told where the material or good is being sold. Locations may be selected by the user, wherein if the consumer wishes to shop over the internet, such actions can be performed. In other instances, the advertisements may direct the consumer to a local business that carries the materials or goods. In still another embodiment, a ranking of business selling the specific material or good may be provided to the user/consumer. The ranking may be controlled by the number of access attempts from different computers to the website or may be performed through the proprietor of the computer program that may rank results according to a fee charged to businesses wishing to advertise on the computer program.

In embodiments, for example, the computer program may have a preset population of items for sale originally downloaded with the computer program. In other embodiments, a population of items associated with the broadcast may be updated through interaction with a centralized server that is connected to the internet. Access to the centralized server may be free, or access may be granted upon payment of a fee or membership.

After connection with the server at 300, a list of materials being sold or advertised may be displayed at 308. A user, at 310, may select an item for purchase, allowing for the terms of sale to be generated and displayed to the user. In one example embodiment, the selection of a good or item for purchase is generated on the electronic device and data is transferred to the computer server. At 312, the purchase is completed. The purchase may be done through exchange of credit card information, bank transfer, gift card or other recognized financial transaction between the electronic device and the server, as a non-limiting embodiment. As will be understood, the owner of the computer program may charge fees to different advertisers to allow for advertisement of items. In other embodiments, the users will be directed to a single purchasing website.

Figure 4:
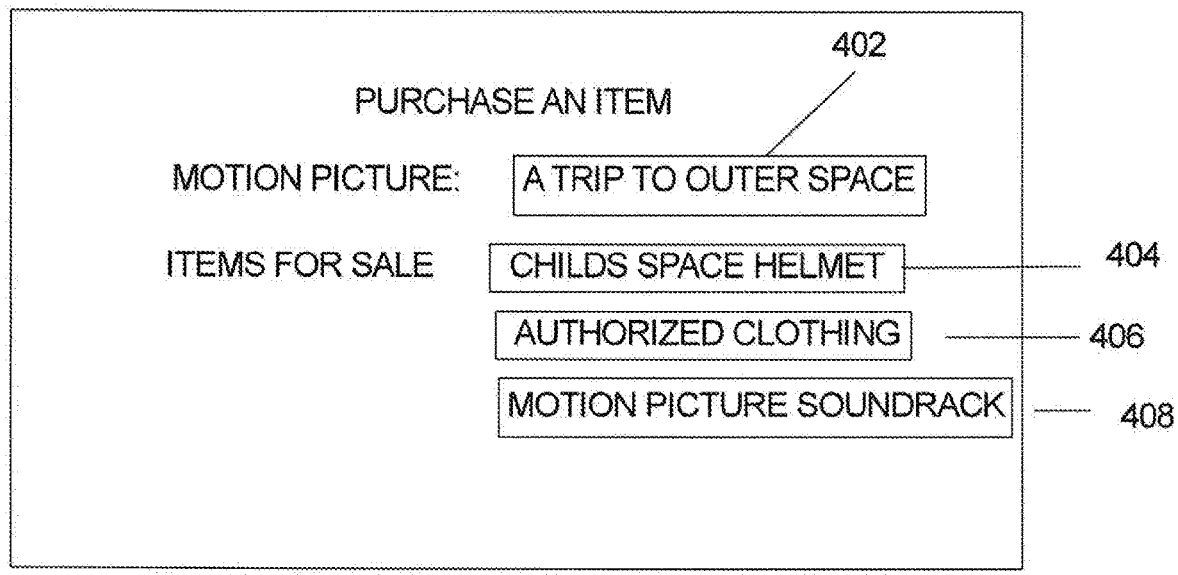
FIG. 4 is a view of a selection screen for a user to purchase an item using the system described in FIG. 1.

Referring to FIG. 4, a view of a selection screen for a user to purchase an item using the system described in FIG. 1 is presented. The user is provided with a name of a broadcasted program 402 and articles for sale 404, 406, 408.

Figure 5:
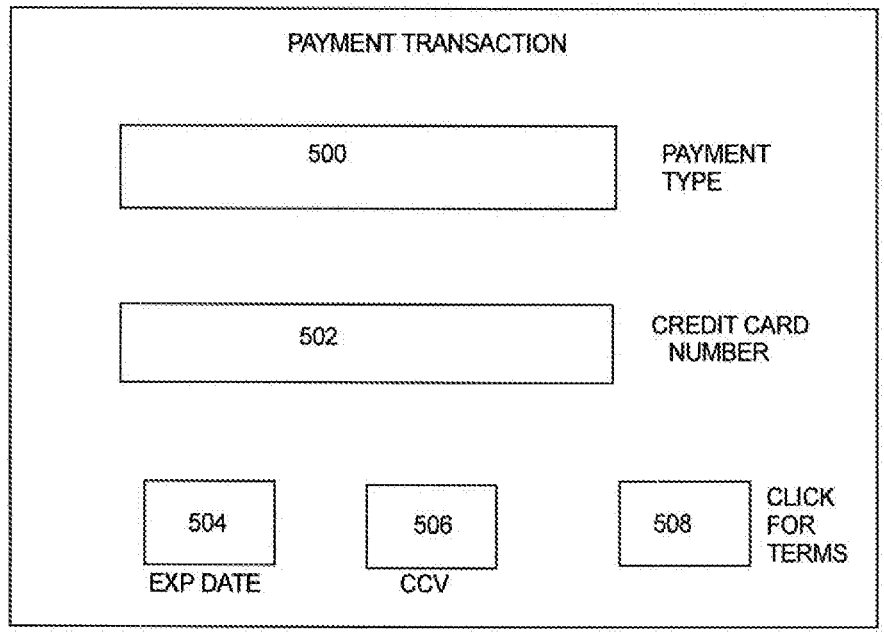
FIG. 5 is a view of a payment screen for a user following the purchase selection accomplished in FIG. 4.

Referring to FIG. 5, a view of a payment screen for a user following the purchase selection accomplished in FIG. 4. The payment screen may include a payment selection type 500, a credit card number portion 502, an expiration date code 504, a CCV number 506 and terms and conditions section 508.

As will be understood, the computer program may be linked to the broadcast, wherein individual advertisements may be made according to the types of materials being displayed or discussed in the broadcast. Such actions allow for dynamic advertising capabilities that are not present in conventional "web-based" or static type sales programs. Thus, the dynamic advertising capabilities have a far greater success rate compared to conventional "unintelligent" advertising. The dynamic advertising capabilities, therefore, can be changed by the computer program custodian, instead of standard "form based" advertising. Advertising may be altered according to the season, time of day, local holiday, day of the week or other advertising strategy. As a non-limiting example, flowers may be advertised at specific times of the year that flowers are customary to give. Such "just in time" advertising allows advertisers to reach an audience that normally would be unavailable to shop, such as at a motion picture theater, thereby increasing exposure for products.

As will be understood, embodiments of the disclosure may be hosted and performed as software as a service ("SAAS"). Such embodiments may provide for a licensing and delivery model in which the software is provided on a subscription basis. Such embodiments provide for a consistent financial revenue stream for the developer as well as freedom of the end user for choosing and updating software, as needed. Development of the application may be performed in different known languages, such as C, C+, as well as other languages. Embodiments may be "web based" for executable files, thereby allowing a single update to occur from the software manufacturer.

As will be further understood, subscription times, amounts and durations may be varied according to programming. For example, the methods illustrated may be made free to certain individuals at certain times of the year, based upon various parameters. For example, if selling of goods related to school items would be advantageous when children would be returning to school from a holiday or a vacation, subscription fees may be waved during those times. As will be understood, items for sale may be tied to specific holidays, times of the year or season-based events. Notifications of changes in subscription fees or advertising of special events may be provided to users through email, web-based application or cellular telephone is different embodiments.

In one non-limiting example embodiment, a method of marketing and selling goods, is disclosed. In one non-limiting embodiment, the method may comprise broadcasting a stream of data from a data source. The method may also comprise using an electronic device to identify the data source. The method may also comprise connecting the electronic device to a server to retrieve the marketing and goods being sold in connection with the data source. The method may also comprise displaying the marketing and goods that are connected to the data source.

In another example embodiment, the method may be performed wherein the stream data is a video stream.

In another example embodiment, the method may be performed wherein the broadcasting is done on a television.

In another example embodiment, the method may be performed wherein the electronic device is at least one of a laptop computer, a computer, a cellular phone, a tablet and a television.

In another example embodiment, the method may be performed wherein the displaying the marketing and goods is performed on one of a computer and a cellular telephone.

In another example embodiment, the method may further comprise selecting at least one of the goods for purchase on the electronic device and ordering the goods for purchase.

In another example embodiment, the method may be performed wherein the ordering the goods for purchase comprises sending data from the electronic device to a computer server regarding the selected goods.

In another example embodiment, the method further comprises performing a financial transaction regarding the ordering of the goods for purchase.

In another example embodiment, the method may be performed wherein the performing the financial transaction involves using a credit card.

In another example embodiment, the method may be performed wherein the retrieving the marketing and goods being sold in connection with the data source includes providing at least one website for review by a user.

In another example embodiment, the method may be performed wherein each website provided is presented in a ranked order.

In another example embodiment, a method of performing marketing and selling of goods is disclosed. The method may comprise broadcasting a motion picture to at least one viewer. The method may also comprise identifying the motion picture using an electronic device. The method may also comprise connecting the electronic device to an internet connected server. The method may also comprise retrieving a list of goods being sold related to the motion picture to the electronic device. The method may also provide for displaying the list of goods that are connected to the data source.

In another example embodiment, the method may be performed wherein the displaying is performed on one of a computer and a cellular telephone.

In another example embodiment, the method may be performed wherein a list of goods displayed are ranked.

In another example embodiment, the method may be performed wherein the ranking is performed by one of payment of a fee and user visits.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of performing a method marketing and selling goods, comprising:
broadcasting a stream of data from a data source;
using an electronic device to identify the data source;
connecting the electronic device to a server to retrieve the marketing and goods being sold in connection with the data source; and
displaying on the electronic device, the marketing and goods that are connected to the data source, wherein the retrieving the marketing and goods being sold in connection with the data source includes providing at least one website for review by a user and wherein each website provided is presented in a ranked order and wherein the ranked order is based on a fee charged to a party wishing to advertise on the electronic device and based upon the data displayed in the broadcast;
selecting at least one of the goods for purchase on the electronic device; and
ordering the goods for purchase wherein the ordering the goods for purchase comprises:
sending data from the electronic device to a computer server regarding the selected goods.

2. The method according to claim 1, wherein the stream data is a video stream.

3. The method according to claim 1, wherein the broadcasting is done on a television.

4. The method according to claim 1, wherein the electronic device is at least one of a laptop computer, a computer, a cellular phone, a tablet and a television.

5. The method according to claim 1, wherein the displaying the marketing and goods is performed on one of a computer and a cellular telephone.

6. The method according to claim 1, further comprising:
performing a financial transaction regarding the ordering of the goods for purchase.

7. The method according to claim 6, wherein the performing the financial transaction involves using a credit card.

8. A method of performing marketing and selling of goods, comprising:
broadcasting a motion picture to at least one viewer;
identifying the motion picture using an electronic device;
connecting the electronic device to an internet connected server;
retrieving a list of goods being sold related to the motion picture to the electronic device on a website; and
displaying on the electronic device, the list of goods that are connected to the data source wherein each website provided is presented in a ranked order and wherein the ranked order is based on a fee charged to a party wishing to advertise on the electronic device and based upon the data displayed in the broadcast;
selecting at least one of the goods for purchase on the electronic device; and ordering the goods for purchase wherein the ordering the goods for purchase comprises:

sending data from the electronic device to a computer server regarding the selected goods.

9. The method according to claim 8, wherein the displaying is performed on one of a computer and a cellular telephone.

10. The method according to claim 8, wherein the ranking is also performed by user visits.

\* \* \* \* \*